Patented Apr. 14, 1931

1,800,445

UNITED STATES PATENT OFFICE

HARRY B. DYKSTRA, OF WILMINGTON, DELAWARE, ASSIGNOR, BY MESNE ASSIGNMENTS, TO THE GRASSELLI CHEMICAL COMPANY, OF CLEVELAND, OHIO, A CORPORATION OF DELAWARE

FLUX FOR SOFT SOLDERING

No Drawing. Application filed March 24, 1930. Serial No. 438,634.

The action of fluxes used in soft soldering operations is understood to comprise removal of the oxide films on the metal pieces to be united and to allow the molten solder to spread, or run over the metals, thereby producing contact and adhesion between solder and metal.

Practical experience has shown that zinc chloride, ammonium chloride and rosin, or colophony have to a remarkable degree the properties required of a soft soldering flux. On the other hand, each metal requires a different flux to obtain the best results and on flat work a different flux has to be used than that used on concave or convex surfaces. In view of the wide difference of chemical constitution and behavior of the commonest used fluxes and other fluxes which have been suggested in late years, it would seem that no conclusion can be drawn from chemical constitution as to effectiveness of a given substance for use as a soldering flux and the development of new and efficient fluxes is a matter of practical experimentation.

I have found that the various members of a certain class of resinous, synthetic substances have fluxing properties which make them desirable for use in soft soldering various metals. These substances as a class can be described as synthetic, halogen-containing, polymerized olefinic compounds and my invention comprises the use as fluxes in soft soldering operations of such synthetic, halogen-containing, polymerized olefinic compounds.

The following are a few typical representatives of this class of substances: polymerized-chloro-styrene, alpha-polyvinyl-chloride, chlorinated meta-styrene, polymerized-vinyl-chloracetate. As will be seen from this list the term synthetic, halogen-containing, polymerized olefinic compound as meant to embrace various materials as obtained by polymerization of chlorine-containing olefinic compounds, as well as chlorination products of polymerized vinyl-compounds, styrene, etc., or in other words, such products into which halogen has been introduced either before or after polymerization.

These synthetic, chlorine-containing, polymerized olefinic compounds are good fluxes for the soft soldering of aluminum, galvanized iron, and tin plate. In addition they are effective in varying degrees in the soldering of metals and alloys, for example, brass, copper, and steel.

Polymerized-chloro-styrene is for instance good as a flux on tin plate and usable on brass, copper and galvanized iron.

Alpha-polyvinyl-chloride gives an excellent spread of tin-lead solder on brass and galvanized iron but is less satisfactory for soldering copper and steel.

Chlorinated meta-styrene is an excellent flux for tin-plate, brass and galvanized iron.

Polymerized vinyl-chloracetate is excellent on tin-plate, brass, galvanized iron and could be used to advantage on copper.

In all instances where a good spread of the solder was obtained, due to the action of the flux, there was also good adhesion of the solder and metal. The resin-like synthetic, chlorine-containing, polymerized olefines are usually very difficultly soluble in alcohol and particularly insoluble in water; when liquid fluxes are desired they have to be dissolved in benzol or other suitable organic solvents. It is, however, much more convenient to use these synthetic resins in their solid form for application as fluxes. Chlorinated meta-styrene, alpha-poly-vinyl chloride and polymerized chloro-styrene are, for instance, white to cream colored powders, which are easily sprinkled over the metal pieces to be soldered, and they can be applied in exactly the same manner as other heretofore known powdered soldering fluxes, such as ammonium chloride or zinc ammonium chloride. Vinyl-chloracetate polymers have a physical consistency resembling that of rosins, and when applied as fluxes this polymer is used in exactly the same manner as rosin and colophony fluxes, and the slight modifications in the fluxing technique which its use might entail are entirely within the knowledge and experience of those skilled in this art.

I claim:

1. In a process of soft soldering metals the step of applying a flux comprising a synthetic, halogen-containing, polymerized olefinic compound.

2. In a process of soft soldering metals the step of applying a flux comprising a synthetic, chlorine-containing, polymerized olefinic compound.

3. In a process of soft soldering metals the step of applying a flux comprising a resinous substance selected from the group of chlorine containing polymerized vinyl and styrene compounds.

4. In a process of soft soldering metals the step of applying a flux comprising chlorinated meta-styrene.

5. A soldering flux comprising a synthetic, halogen-containing, polymerized olefinic compound.

6. A soldering flux comprising a synthetic, chlorine-containing, polymerized olefinic compound.

7. A soldering flux comprising a resinous substance selected from the group of chlorine-containing, polymerized vinyl and styrene compounds.

8. A soldering flux comprising chlorinated meta styrene.

In testimony whereof, I affix my signature.

HARRY B. DYKSTRA.